(12) United States Patent
Uccellani et al.

(10) Patent No.: US 10,865,940 B1
(45) Date of Patent: Dec. 15, 2020

(54) GREASE COUPLER

(71) Applicant: Macnaught Pty Ltd, Turrella (AU)

(72) Inventors: Marco Uccellani, Turrella (AU); Prabhjot Singh, Turrella (AU)

(73) Assignee: MACNAUGHT PTY LTD, Turrella (AU)

( * ) Notice: Subject to any disclaimer, the term of this patent is extended or adjusted under 35 U.S.C. 154(b) by 0 days.

(21) Appl. No.: 16/300,376

(22) PCT Filed: Jun. 27, 2018

(86) PCT No.: PCT/AU2018/050651
§ 371 (c)(1),
(2) Date: Nov. 9, 2018

(87) PCT Pub. No.: WO2019/000035
PCT Pub. Date: Jan. 3, 2019

(30) Foreign Application Priority Data

Jun. 27, 2017 (AU) .................................. 2017902478

(51) Int. Cl.
*F16N 21/04* (2006.01)
*F16L 37/23* (2006.01)
*F16N 3/12* (2006.01)
*F16L 37/12* (2006.01)

(52) U.S. Cl.
CPC ............ *F16N 21/04* (2013.01); *F16L 37/121* (2013.01); *F16L 37/23* (2013.01); *F16N 3/12* (2013.01)

(58) Field of Classification Search
CPC ..... F16N 3/12; F16N 3/10; F16N 3/00; F16N 5/00; F16N 5/02; F16N 21/04; F16N 21/00; F16L 37/23; F16L 37/121
See application file for complete search history.

(56) References Cited

U.S. PATENT DOCUMENTS

| 1,744,305 | A |   | 1/1930 | Gannaway |   |
|---|---|---|---|---|---|
| 1,796,827 | A | * | 3/1931 | Butler | F16N 21/04 |
|   |   |   |   |   | 141/351 |
| 2,056,249 | A | * | 10/1936 | Bystricky | F16N 21/04 |
|   |   |   |   |   | 285/102 |
| 2,070,013 | A |   | 2/1937 | Krannak |   |
| 2,104,146 | A | * | 1/1938 | Adams | F16N 3/12 |
|   |   |   |   |   | 184/105.3 |
| 2,274,651 | A | * | 3/1942 | Barks | F16N 21/04 |
|   |   |   |   |   | 285/102 |

(Continued)

FOREIGN PATENT DOCUMENTS

| EP | 3143319 A1 * | 3/2017 | ............ F16L 37/23 |
|---|---|---|---|
| GB | 695656 A | 8/1953 | |

(Continued)

OTHER PUBLICATIONS

Written Opinion for International Patent Application No. PCT/AU2018/050651, dated Sep. 5, 2018.

(Continued)

*Primary Examiner* — David Colon-Morales
(74) *Attorney, Agent, or Firm* — K&L Gates LLP (57) ABSTRACT

A grease coupler, comprising: an outer sleeve; an inner sleeve; a connection body; a collar; a collar spring; jaws to lock and unlock with a grease nipple; a nozzle; a nozzle spring; a collar ball groove; and an inner ball groove; sleeve locking balls; a nozzle ball groove; and nozzle locking balls.

7 Claims, 6 Drawing Sheets

(56) References Cited

U.S. PATENT DOCUMENTS

| | | | | |
|---|---|---|---|---|
| 2,311,097 | A * | 2/1943 | Sundholm | F16N 21/04 184/105.1 |
| 2,362,880 | A * | 11/1944 | Campbell | F16N 21/04 184/105.1 |
| 2,396,499 | A * | 3/1946 | Fitch | F16N 21/04 285/306 |
| 2,397,342 | A * | 3/1946 | Farrell | F16N 21/04 184/105.1 |
| 2,400,817 | A * | 5/1946 | Fox | F16N 21/04 184/105.3 |
| 2,425,692 | A * | 8/1947 | Clapp | F16N 21/04 184/105.1 |
| 2,714,021 | A * | 7/1955 | Froidevaux | F16N 21/04 285/102 |
| 2,754,135 | A | 7/1956 | Kramer | |
| 2,764,769 | A * | 10/1956 | Neuman | F16N 21/04 15/105 |
| 2,784,987 | A | 3/1957 | Corcoran | |
| 3,421,792 | A * | 1/1969 | Sundholm | F16N 3/12 285/98 |
| 3,464,436 | A | 9/1969 | Bruning | |
| 3,589,470 | A * | 6/1971 | Dorn | F16N 21/04 184/5.1 |
| 3,589,673 | A | 6/1971 | Cruse | |
| 3,779,586 | A | 12/1973 | Rossiter | |
| 4,195,812 | A | 4/1980 | Norcross | |
| 4,546,956 | A | 10/1985 | Moberg | |
| 4,607,727 | A * | 8/1986 | Jochum | F16N 3/12 184/105.1 |
| 6,279,874 | B1 * | 8/2001 | Nyberg | F16L 37/121 137/614.03 |
| 6,511,100 | B1 | 1/2003 | Le Clinche | |
| 6,675,833 | B2 | 1/2004 | Maldavs | |
| 6,776,187 | B1 | 8/2004 | Marquis et al. | |
| 7,073,773 | B2 | 7/2006 | Nuttall et al. | |
| 8,720,487 | B2 | 5/2014 | Cooley | |
| 8,955,544 | B2 * | 2/2015 | Gurney | F16N 21/02 137/539 |
| 10,415,749 | B2 * | 9/2019 | Hung | F16N 21/04 |
| 2012/0061953 | A1 * | 3/2012 | Liu | F16L 37/23 285/305 |
| 2015/0115601 | A1 | 4/2015 | Boucher et al. | |
| 2019/0120413 | A1 * | 4/2019 | Verma | F16L 37/121 |

FOREIGN PATENT DOCUMENTS

| | | | | |
|---|---|---|---|---|
| GB | | 792710 A * | 4/1958 | F16L 37/32 |
| WO | 2011/069172 A1 | | 6/2011 | |

OTHER PUBLICATIONS

Extended European Search Report, Application No. 18800826.2, dated Jan. 23, 2020.

Australian Examination Report No. 1, Application No. 2018256611, dated Nov. 16, 2018.

* cited by examiner

GREASE COUPLER

CROSS-REFERENCE TO RELATED APPLICATIONS

This application is a U.S. national stage application, filed under 35 U.S.C. § 371, of International Application No. PCT/AU2018/050651, which was filed on Jun. 27, 2018, and which claims priority to Australian Patent Application No. 2017902478, which was filed on Jun. 27, 2017. The contents of each are incorporated by reference into this specification.

FIELD

The present invention relates to grease couplers.

BACKGROUND

Grease couplers connect a grease nipple to pressurised grease from a grease gun.

Conventional couplers suffer from several drawbacks. It is difficult to positively couple and uncouple the coupler and the nipple, particularly under high grease pressure. This requires noticeable physical effort and also leads to wear and tear, or even failure of the components. The lack of positive coupling and uncoupling also leads to leaking of grease, or even spurting of high pressure grease back onto an operator. Furthermore, build-up of back pressure inside the coupler can lead to the formation of hydraulic lock which prevents positive uncoupling of the coupler and the nipple. Most conventional quick-release couplers are bulky which poses problems of access to tight greasing points.

In this context, there is a need for improved grease couplers.

SUMMARY

According to the present invention, there is provided a grease coupler, comprising:

an outer sleeve axially movable on an inner sleeve, each of which has an inlet end and an outlet end;

a connection body connected to the inlet end of the inner sleeve;

a collar axially movable on the outer sleeve between the connection body and the inlet end of the outer sleeve;

a collar spring on the inlet end of the inner sleeve between the collar and the connection body to axially bias the collar toward the outlet end of the outer sleeve;

jaws axially and radially movable in the outlet end of the outer sleeve to lock and unlock with a grease nipple;

a nozzle axially movable in the outlet end of the outer sleeve between the jaws and the outlet end of the inner sleeve;

a nozzle spring in the inner sleeve between the nozzle and the connection body;

a collar ball groove in the collar and a corresponding inner ball groove in the inner sleeve;

sleeve locking balls axially and radially movable between the collar ball groove and the inner ball groove via ball holes in the outer sleeve;

a nozzle ball groove in the nozzle; and nozzle locking balls in the outlet end of the inner sleeve and axially movable within a limited axial distance defined by the nozzle ball groove;

wherein a first retraction of the collar axially away from the outlet end of the outer sleeve pre-arms the grease coupler for coupling to the grease nipple by axially and radially moving the sleeve locking balls from the collar ball groove to the inner ball groove to lock the outer sleeve and the inner sleeve to one another to thereby permit relative axial movement between the outer sleeve and the nozzle to lock the jaws;

wherein pushing the grease nipple inside the outlet end of the outer sleeve initially moves the nozzle axially away from the jaws to unlock the jaws and compress the nozzle spring, and subsequently moves the nozzle axially toward the grease nipple under spring pressure by the nozzle spring to thereby relock the jaws and positively couple the nozzle to the grease nipple; and wherein a second retraction of the collar axially away from the outlet end of the outer sleeve moves the sleeve locking balls from the inner ball groove to the collar ball groove to unlock the outer sleeve and the inner sleeve from one another to thereby permit relative axial movement between the outer sleeve and the nozzle to thereby unlock the jaws from the grease nipple, while relative axial movement between the nozzle and the inner sleeve is limited by axial movement of the nozzle locking balls within the limited axial distance defined by the nozzle ball groove to thereby positively uncouple the nozzle from the grease nipple.

The outlet end of the outer sleeve may have an inwardly inclined lip, wherein the jaws are axially and radially movable against the inwardly inclined lip to lock and unlock with the grease nipple.

A nozzle flange may extend radially from the nozzle to axially move the jaws toward the inwardly inclined lip at the outlet end of the outer sleeve.

A pair of finger grips may extend radially from the collar to axially move the collar axially away from the outlet end of the outer sleeve.

A ball check valve may be provided in the connection body.

The ball check valve may be an adjustable ball check valve.

The present invention also provides a method, comprising positively coupling and uncoupling a grease nipple to pressurised grease from a grease gun using the grease coupler described above.

BRIEF DESCRIPTION OF DRAWINGS

Embodiments of the invention will now be described by way of example only with reference to the accompanying drawings, in which.

DESCRIPTION OF EMBODIMENTS

Figure 1:
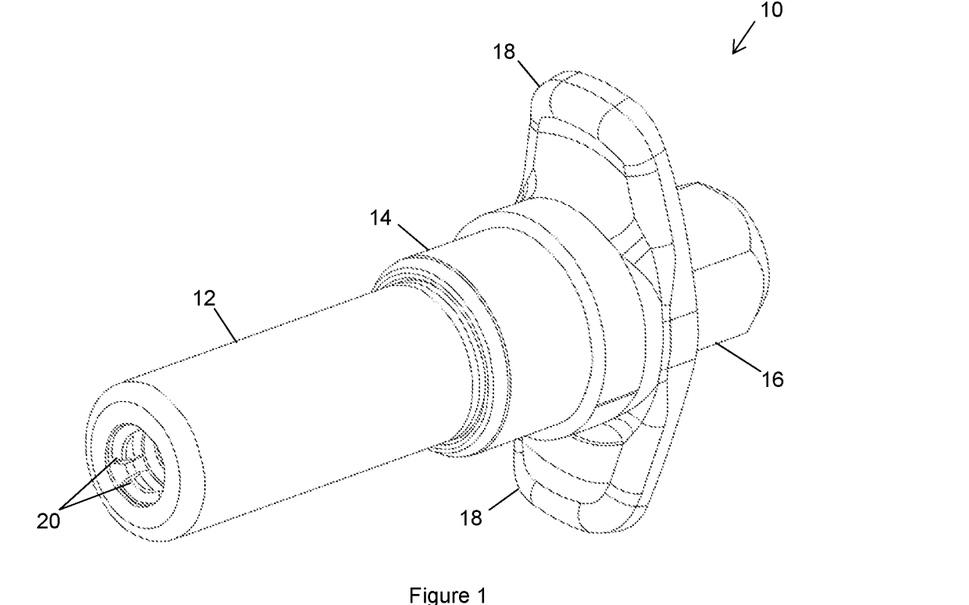
FIGS. 1 and 2 are perspective front and rear views of a grease coupler according to an embodiment of the present invention.
Figure 2:
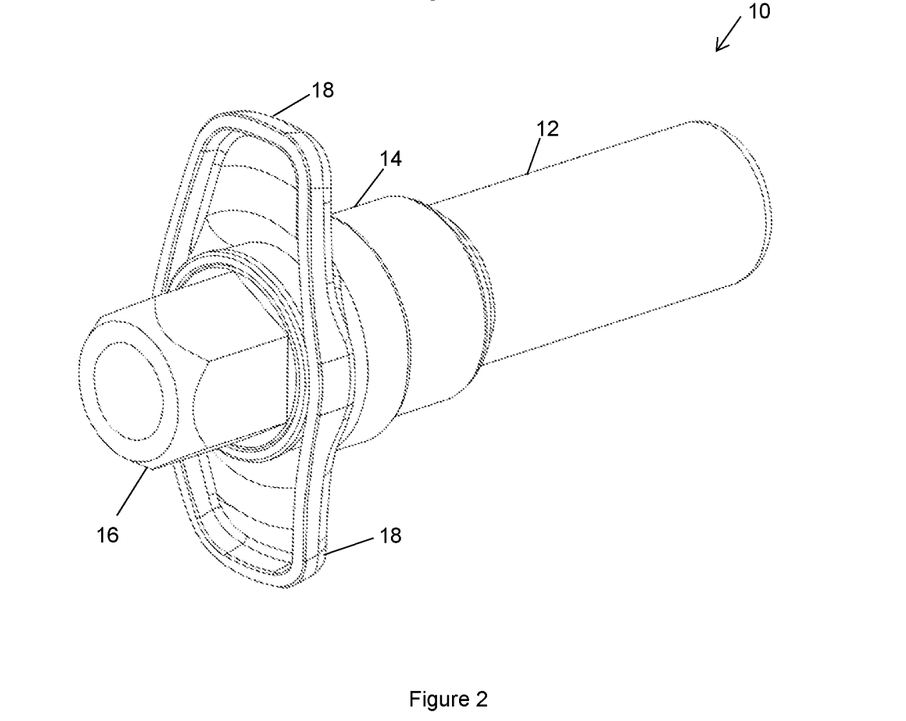

Referring to FIGS. 1 and 2, a grease coupler 10 according to an embodiment of the present invention may generally comprise an outer sleeve 12, an actuation collar 14, and a connection body 16. A pair of finger grips 18 may extend radially from the collar 14 to axially move the collar 14 axially away from an outlet end of the outer sleeve 12. The connection body 16 may be threadingly connectable to a grease gun hose (not shown). Clamping jaws 20 may be provided in an outlet end of the outer sleeve 12 to lock and unlock with a grease nipple, for example, a Zerk nipple (not shown). The finger grips 18 may be a moulding of suitable plastics materials, while the remaining components may be formed from suitable metals or metal alloys unless stated otherwise.

Figure 3:
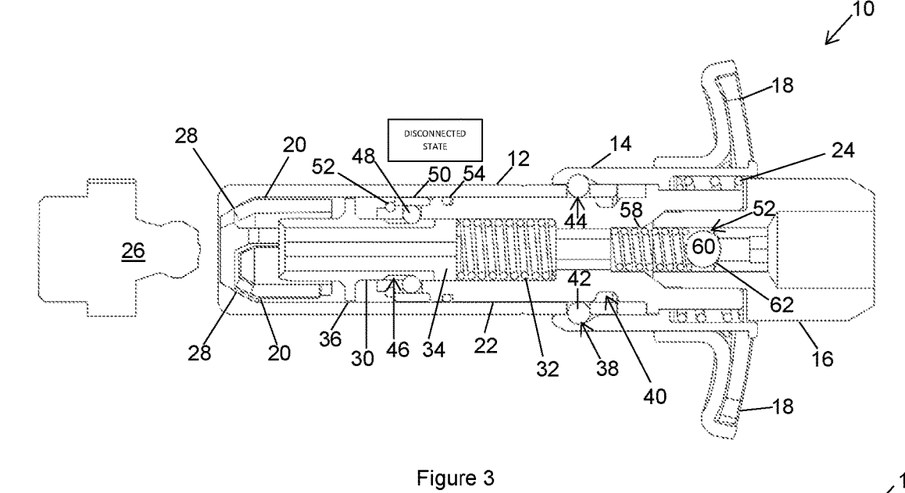
FIG. 3 is a section view of the grease coupler in an uncoupled state.

Referring to FIG. 3, the outer sleeve 12 may be axially movable on an inner sleeve 22. The outer sleeve 12 and the inner sleeve 22 may each have an inlet end and an outlet end. The connection body 16 may be threadingly connected to the inlet end of the inner sleeve 22. The collar 14 may be axially movable on the outer sleeve 12 between the connection body 16 and the inlet end of the outer sleeve 12. A collar spring 24 may be provided on the inlet end of the inner sleeve 22 between the collar 14 and the connection body 16 to axially bias the collar 14 toward the outlet end of the outer sleeve 22.

The jaws 20 may be axially and radially movable in the outlet end of the outer sleeve 12 to lock and unlock with a grease nipple 26. The outlet end of the outer sleeve 12 may have an inwardly inclined lip 28, and the jaws 20 may be axially and radially movable against the inwardly inclined lip 28 to lock and unlock with the grease nipple 26. The jaws 20 may comprise three jaws 20 spaced circumferentially around 120° from one another each other in a floating configuration for gripping the grease nipple 26. This configuration advantageously provides maximum grip surface, and lower and more even contact stress on grease nipples 26 to avoid damaging them. In comparison to four jaws spaced circumferentially around 90° from one another, the three-floating configuration of the jaws 20 is more versatile and conforms better to standardised shapes, sizes and tolerances of grease nipples 26 (eg, SAE J534, BS1486 and DIN71412 applicable standards). This is advantageous as grease nipples 26 are no longer machined for cost reasons, and hence are not as dimensionally accurate and consistent as they used to be.

A nozzle 30 may be axially movable in the outlet end of the outer sleeve 12 between the jaws 20 and the outlet end of the inner sleeve 22. The connection body 16, the inner sleeve 22, the outer sleeve 12, the nozzle 30 may collectively define a flow passage for pressurised grease from the grease gun hose to the grease nipple 26. A nozzle spring 32 may be provided in the inner sleeve 22 between the nozzle 30 and the connection body 16. A rubber nozzle seal 34 may be provided in the nozzle 30. A nozzle flange 36 may extend radially from the nozzle 30 to axially move the jaws 20 toward the inwardly inclined lip 28 at the outlet end of the outer sleeve 12.

A collar ball groove 38 may be formed in the collar 14, and a corresponding inner ball groove 40 may be formed in the inner sleeve 22. Sleeve locking balls 42 may be axially and radially movable between the collar ball groove 38 and the inner ball groove 40 via ball holes 44 formed in the outer sleeve 12.

A nozzle ball groove 46 defining a limited axial distance may be formed in the nozzle 30. Nozzle locking balls 48 may be provided in the outlet end of the inner sleeve 22 to be axially movable within the limited axial distance defined by the nozzle ball groove 46. The nozzle locking balls 48 may be axially retained by a retaining ring 50 and a snap ring (or circlip) 52. An O-ring 54 may be provided in an O-ring groove on the inner sleeve 22 axially inward of the nozzle.

A ball check valve 56 may be provided in the connection body 16. The ball check valves 56 may comprise a valve spring 58, a valve ball 60 and an adjustable valve seat ring 62 that provides selectively adjustable limitation of pressurised grease flow from the grease gun hose after disconnection.

Figure 4:
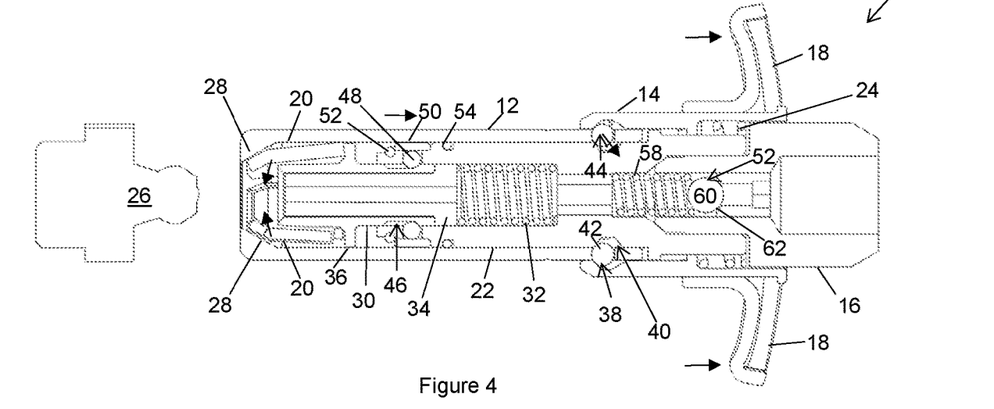
FIGS. 4 to 6 are sequential section views showing pre-arming of the grease coupler for coupling with a grease nipple.
Figure 5:
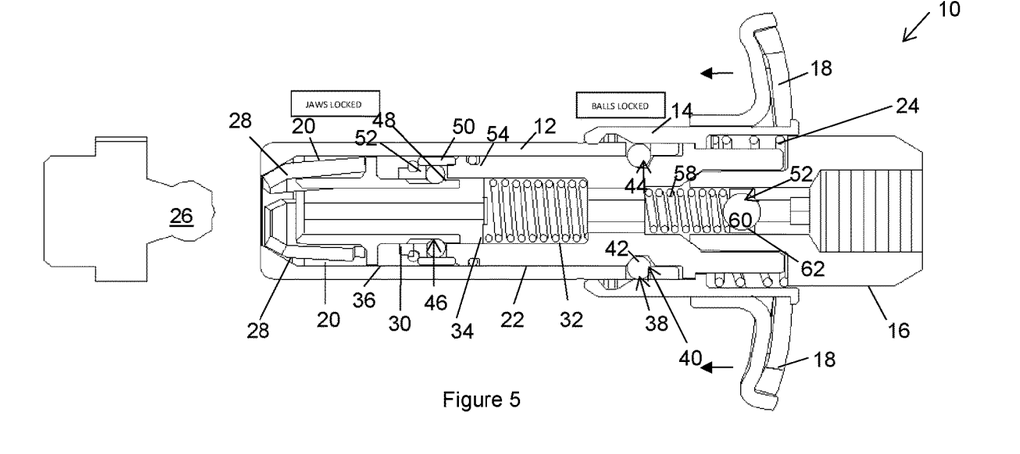
Figure 6:
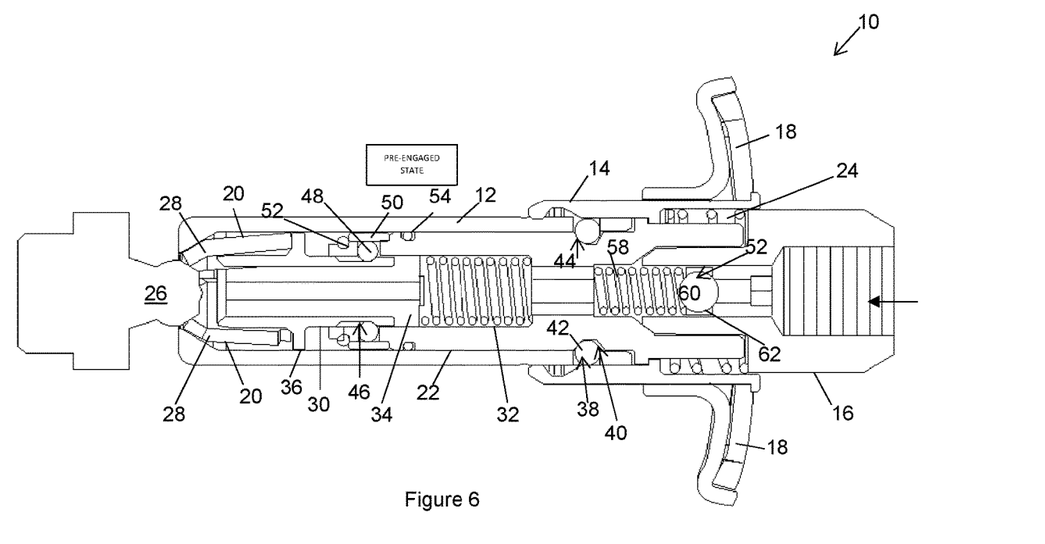

Referring to FIG. 4, a first retraction of the collar 14 axially away from the outlet end of the outer sleeve 12 pre-arms the grease coupler 10 for coupling to the grease nipple 26 by axially and radially moving the sleeve locking balls 42 from the collar ball groove 38 to the inner ball groove 40 to lock the outer sleeve 12 and the inner sleeve 22 to one another to thereby permit relative axial movement between the outer sleeve 12 and the nozzle 30 to lock the jaws 20. As illustrated in FIG. 5, after the first retraction, the collar 14 is axially biased back toward the outlet end of the outer sleeve 12 by the collar spring 24. This leaves the grease collar 10 pre-armed and ready to positively couple to the grease nipple 26, as illustrated in FIG. 6.

Figure 7:
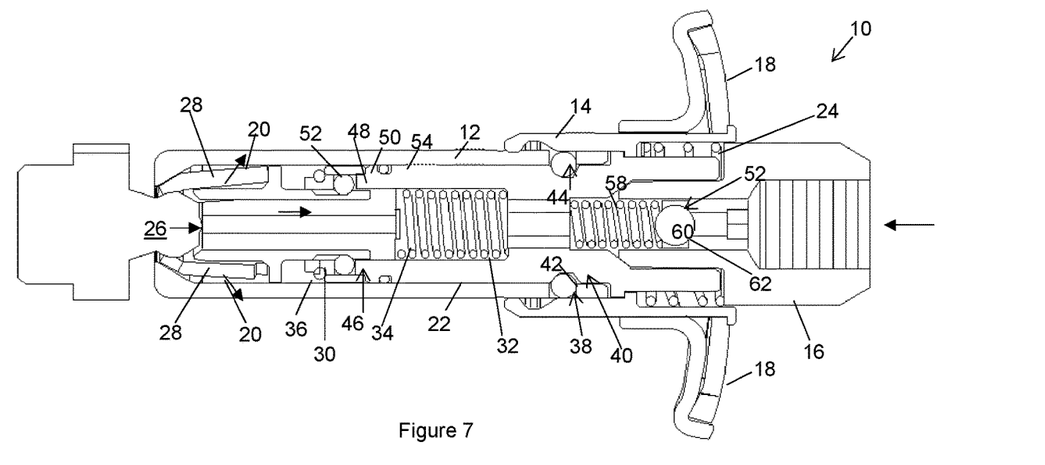
FIGS. 7 to 9 are sequential section views showing positive coupling of the grease coupler to the grease nipple.
Figure 8:
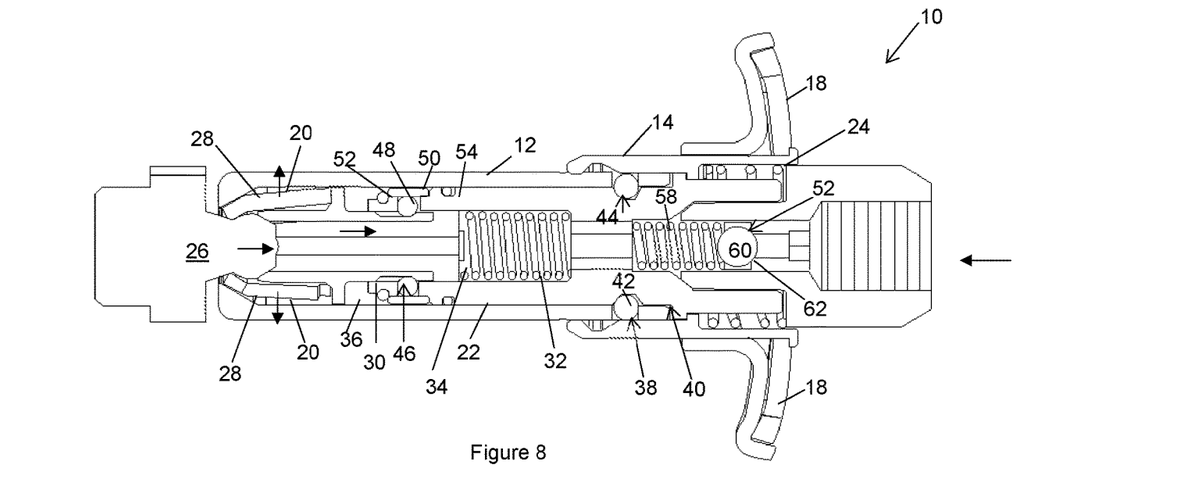
Figure 9:
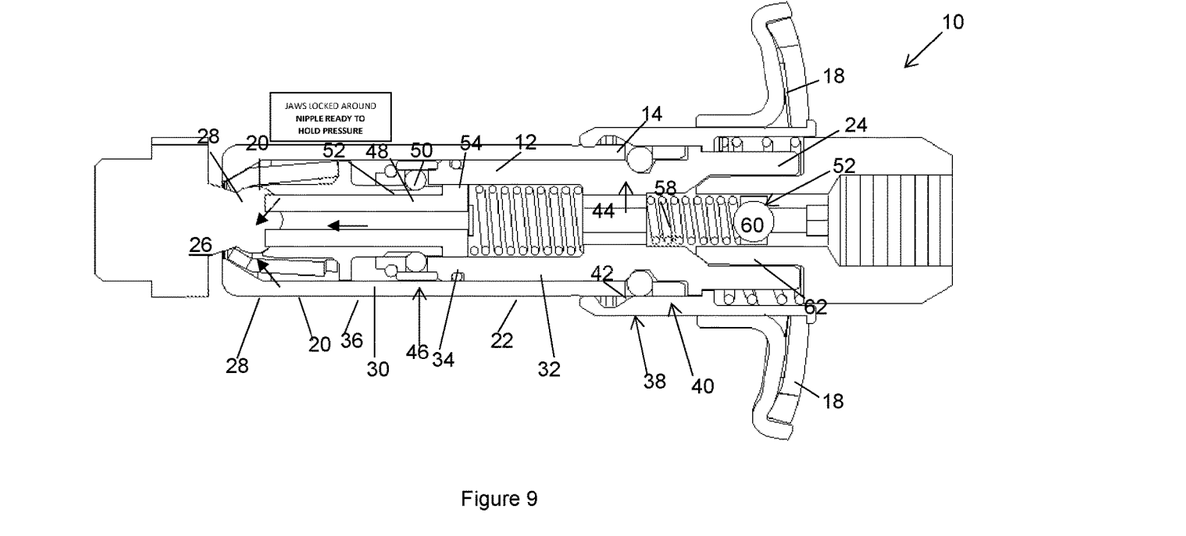
Figure 10:
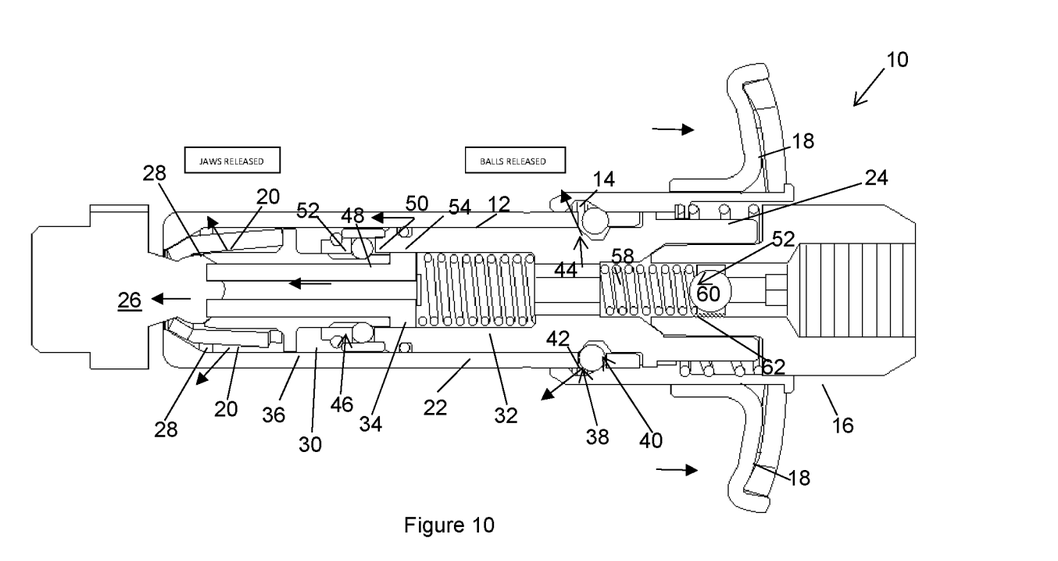
FIGS. 10 to 13 are sequential section views showing positive uncoupling of the grease coupler from the grease nipple.
Figure 11:
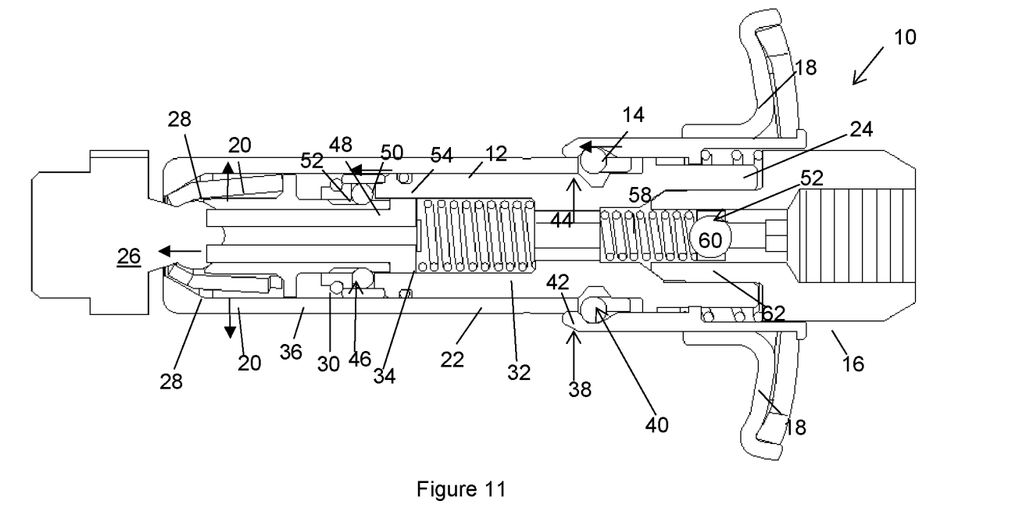
Figure 12:
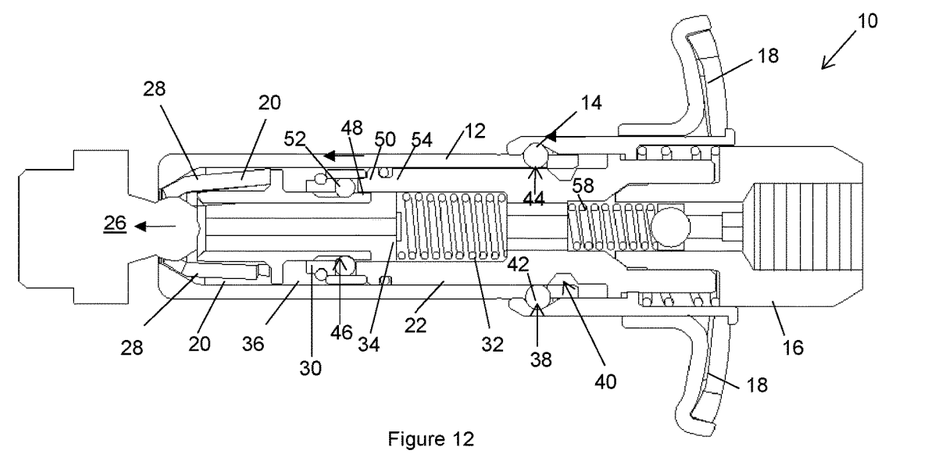
Figure 13:
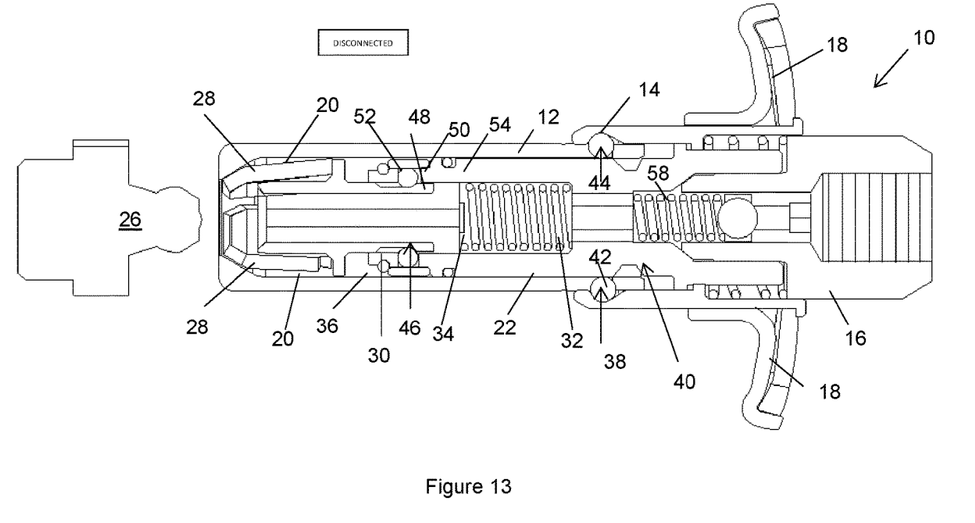

Referring to FIG. 7, pushing the grease nipple 26 inside the outlet end of the outer sleeve 12 initially moves the nozzle 30 axially away from the jaws 20 to unlock the jaws 20 and compress the nozzle spring 32. As illustrated in FIG. 8, the nozzle 30 is subsequently moved axially toward the grease nipple 26 under spring pressure by the nozzle spring 32 to thereby relock the jaws 20 and positively couple the nozzle 30 to the grease nipple 26. This leaves the grease coupler 10 in a positively coupled state with the grease nipple, as illustrated in FIG. 9, to allow pressurised grease to be supplied from the grease gun hose to the grease nipple 26.

Referring to FIGS. 10 to 13, a second retraction of the collar 14 axially away from the outlet end of the outer sleeve 12 moves the sleeve locking balls 42 from the inner ball groove 40 back into the collar ball groove 38 to unlock the outer sleeve 12 and the inner sleeve 22 from one another to thereby permit relative axial movement between the outer sleeve 12 and the nozzle 30 to unlock the jaws 20 from the grease nipple 26, while relative axial movement between the nozzle 30 and the inner sleeve 22 is limited by the nozzle locking balls 48 axially moving within the limited axial distance defined by the nozzle ball groove 46 to positively uncouple the nozzle 30 from the grease nipple 26. The positive nozzle retention provided by the nozzle ball groove 46 and the nozzle locking balls 48 during uncoupling may overcome any hydraulic lock between the grease nipple 26 and the nozzle 30 from build-up of back pressure inside the grease coupler 10.

Embodiments of the present invention provide grease couplers that are useful for positively coupling and uncoupling grease nipples to pressurised grease from grease guns, while avoiding or minimising leaking or back spurting of grease.

For the purpose of this specification, the word "comprising" means "including but not limited to," and the word "comprises" has a corresponding meaning.

The above embodiments have been described by way of example only and modifications are possible within the scope of the claims that follow.

The invention claimed is:

1. A grease coupler, comprising:
   an outer sleeve axially movable on an inner sleeve, each of which has an inlet end and an outlet end;
   a connection body connected to the inlet end of the inner sleeve;

a collar axially movable on the outer sleeve between the connection body and the inlet end of the outer sleeve;

a collar spring on the inlet end of the inner sleeve between the collar and the connection body to axially bias the collar toward the outlet end of the outer sleeve;

jaws axially and radially movable in the outlet end of the outer sleeve to lock and unlock with a grease nipple;

a nozzle axially movable in the outlet end of the inner sleeve between the jaws and the outlet end of the inner sleeve;

a nozzle spring in the inner sleeve between the nozzle and the connection body;

a collar ball groove in the collar and a corresponding inner ball groove in the inner sleeve;

sleeve locking balls axially and radially movable between the collar ball groove and the inner ball groove via ball holes in the outer sleeve;

a nozzle ball groove in the nozzle; and nozzle locking balls in the outlet end of the inner sleeve and axially movable within a limited axial distance defined by the nozzle ball groove;

wherein a first retraction of the collar axially away from the outlet end of the outer sleeve pre-arms the grease coupler for coupling to the grease nipple by axially and radially moving the sleeve locking balls from the collar ball groove to the inner ball groove to lock the outer sleeve and the inner sleeve to one another to thereby permit relative axial movement between the outer sleeve and the nozzle to lock the jaws;

wherein pushing the grease nipple inside the outlet end of the outer sleeve initially moves the nozzle axially away from the jaws to unlock the jaws and compress the nozzle spring, and subsequently moves the nozzle axially toward the grease nipple under spring pressure by the nozzle spring to thereby relock the jaws and positively couple the nozzle to the grease nipple; and wherein a second retraction of the collar axially away from the outlet end of the outer sleeve moves the sleeve locking balls from the inner ball groove to the collar ball groove to unlock the outer sleeve and the inner sleeve from one another to thereby permit relative axial movement between the outer sleeve and the nozzle to thereby unlock the jaws from the grease nipple, while relative axial movement between the nozzle and the inner sleeve is limited by axial movement of the nozzle locking balls within the limited axial distance defined by the nozzle ball groove to thereby positively uncouple the nozzle from the grease nipple.

2. The coupler of claim 1, wherein the outlet end of the outer sleeve has an inwardly inclined lip, and wherein the jaws arranged in a floating configuration are axially and radially movable against the inwardly inclined lip to lock and unlock with the grease nipple.

3. The coupler of claim 2, wherein a nozzle flange may extend radially from the nozzle to axially move the jaws toward the inwardly inclined lip at the outlet end of the outer sleeve.

4. The coupler of claim 1, wherein a pair of finger grips extend radially from the collar to axially move the collar axially away from the outlet end of the outer sleeve.

5. The coupler of claim 1, wherein a ball check valve is provided in the connection body.

6. The coupler of claim 5, wherein the ball check valve is an adjustable ball check valve.

7. A method, comprising positively coupling and uncoupling the grease nipple to pressurized grease from a grease gun using the grease coupler of claim 1.

* * * * *